United States Patent
Otomo et al.

(10) Patent No.: US 6,574,069 B1
(45) Date of Patent: Jun. 3, 2003

(54) FLOPPY DISK DRIVE CONTROL APPARATUS FOR INHIBITING A SEEK OPERATION WHEN A FLOPPY DISK IS NOT LOADED IN A FLOPPY DISK DRIVE

(75) Inventors: Yoshihito Otomo, Yamagata (JP); Shinya Koseki, Higashine (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 333 days.

(21) Appl. No.: 09/613,986

(22) Filed: Jul. 11, 2000

(30) Foreign Application Priority Data

Jul. 14, 1999 (JP) .......................................... 11-200924

(51) Int. Cl.[7] ............................................. G11B 5/596
(52) U.S. Cl. ..................................... 360/78.08; 360/69
(58) Field of Search ................................ 360/78.08, 60, 360/69, 31, 99.01, 99.02, 99.05, 99.06

(56) References Cited

U.S. PATENT DOCUMENTS

| | | | |
|---|---|---|---|
| 4,658,307 A | * 4/1987 | Tsuyuguchi et al. | .......... 360/69 |
| 4,700,243 A | * 10/1987 | Tsuyuguchi et al. | .......... 360/60 |
| 4,736,263 A | * 4/1988 | Takahashi et al. | ............ 360/69 |
| 4,783,706 A | * 11/1988 | Shoji et al. | .................... 360/69 |
| 5,005,088 A | * 4/1991 | Fukushima et al. | ........... 360/69 |

* cited by examiner

Primary Examiner—David Hudspeth
Assistant Examiner—K. Wong
(74) Attorney, Agent, or Firm—Frishauf, Holtz, Goodman & Chick, P.C.

(57) ABSTRACT

In an FDD control apparatus for controlling a floppy disk drive for driving a floppy disk loaded in the floppy disk drive, a counter (34) produces a target track position signal indicative of a target track position for magnetic heads in response to an external seek direction signal and an external step signal. A counter (35) is activated when the floppy disk is loaded in the floppy disk drive to generate an internal step signal. When the floppy disk is loaded in the floppy disk drive, a counter (33) is put into an active state to produce a current track position signal indicative of an actual current track position for the magnetic heads in response to a selected seek direction signal and a selected step signal. A comparing circuit (36) compares the target track position signal with the current track position signal to produce a coincidence signal and an internal seek signal.

2 Claims, 6 Drawing Sheets

FLOPPY DISK DRIVE CONTROL APPARATUS FOR INHIBITING A SEEK OPERATION WHEN A FLOPPY DISK IS NOT LOADED IN A FLOPPY DISK DRIVE

BACKGROUND OF THE INVENTION

This invention relates to a floppy disk drive control apparatus for controlling a floppy disk drive and, more specifically, a stepping motor control circuit for controlling a stepping motor to cause magnetic heads of the floppy disk drive perform a seek operation.

In the manner known in the art, a floppy disk drive (which may be abbreviated to "FDD") is a device for carrying out data recording and reproducing operations to and from a magnetic recording medium of a floppy disk (which may be abbreviated to "FD") loaded therein. Such a floppy disk drive is typically loaded in portable electronic equipment such as a laptop personal computer, a notebook-size personal computer, a notebook-size word processor, or the like.

The floppy disk drive of the type comprises magnetic heads for reading/writing data from/to the magnetic recording medium of the floppy disk, a carriage assembly for supporting the magnetic heads at a tip thereof with the magnetic head movably along a predetermined radial direction to the floppy disk, a stepping motor for moving the carriage assembly along the predetermined radial direction, and a spindle motor for rotatably driving the magnetic recording medium with the floppy disk held. An operation to move the magnetic heads to a target track is called a "seek" operation in the art. This seek operation is carried out by rotating the stepping motor.

An FDD control apparatus is an apparatus for controlling the floppy disk drive. A conventional FDD control apparatus seeks the magnetic heads in a direction (for example, an inner periphery or an outer periphery) designated by an external seek direction signal when a drive select signal is put into an active state of a logic low level and when an external step signal is inputted whether or not a floppy disk is inserted in the floppy disk drive. At any rate, the conventional FDD control apparatus can carry out the seek operation in spite of insertion/noninsertion of the floppy disk.

However, in a case where the floppy disk is not inserted in the floppy disk drive, the conventional FDD control apparatus is disadvantageous in that a seek error occurs and seek noises are raised in the manner which will later be described in conjunction with FIGS. 2A and 2B.

SUMMARY OF THE INVENTION

It is therefore an object of the present invention to provide a floppy disk drive control apparatus which is capable of preventing occurrence of a seek error.

It is another object of the present invention to provide a floppy disk drive control apparatus of the type described, which is capable of suppressing seek noises on absence of a medium.

Other objects of this invention will become clear as the description proceeds.

On describing the gist of this invention, it is possible to be understood that a floppy disk drive control apparatus controls a floppy disk drive for driving a floppy disk loaded in the floppy disk drive.

According to an aspect of this invention, the above-understood floppy disk drive control apparatus comprises an arrangement for inhibiting a seek operation when the floppy disk is not loaded in the floppy disk drive.

According to another aspect of this invention, the above-understood floppy disk drive control apparatus comprises a determining arrangement for determining whether or not the floppy disk is loaded in the floppy disk drive. When the determining means determines that the floppy disk is not loaded in the floppy disk drive, an inhibiting arrangement inhibits a seek operation.

On describing the gist of this invention, it is possible to be understood that a stepping motor control circuit controls, in response to an external seek direction signal and an external step signal which are supplied from the outside, a stepping motor to make magnetic heads of a floppy disk drive a seek operation.

According to an aspect of this invention, the above-understood stepping motor control circuit comprises a head target position track counter for producing, in response to the external seek direction signal and the external step signal, a target track position signal indicative of a target track position for the magnetic heads regardless of whether a floppy disk is loaded in the floppy disk drive or not. When the floppy disk is loaded in the floppy disk drive, an arrangement automatically seeks the magnetic heads up to the target track position indicated by the target track position signal by driving the stepping motor.

According to another aspect of this invention, the above-understood stepping motor control circuit comprises a head target position track counter for producing, in response to the external seek direction signal and the external step signal, a target track position signal indicative of a target track position for the magnetic heads regardless of whether a floppy disk is loaded in the floppy disk drive or not. When the floppy disk is loaded in the floppy disk drive, an internal step signal producing arrangement is activated to produce an internal step signal. When the floppy disk is not loaded in the floppy disk drive, a head current position track counter is inactivated. When the floppy disk is loaded in the floppy disk drive, the head current position track counter is put into an active state to produce, in response to a selected seek direction signal and a selected step signal, a current track position signal indicative of an actual current track position for the magnetic heads. When the floppy disk is loaded in the floppy disk drive, a comparing circuit compares the target track position signal with the current track position signal to produces an internal seek direction signal and a coincidence signal indicative of coincidence/noncoincidence between the target track position and the current track position. When the coincidence signal indicates the noncoincidence, a seek direction selecting arrangement selects the internal seek direction signal as the selected seek direction signal. When the coincidence signal indicates the coincidence, the seek direction selecting arrangement selects the external seek direction signal as the selected seek direction signal. The seek direction selecting arrangement supplies the selected seek direction signal to the head current position track counter. When the floppy disk is loaded in the floppy disk drive, a step signal selecting arrangement is activated. The step signal selecting arrangement selects the internal step signal as the selected step signal when the coincidence signal indicates the noncoincicence. The step signal selecting arrangement selects the external step signal as the selected step signal when the coincidence signal indicates the coincidence. The step signal selecting arrangement supplies the selected step signal to the head current position track counter. A driving arrangement drives the stepping motor on the basis of the selected seek direction signal and the elected step signal.

DESCRIPTION OF THE PREFERRED EMBODIMENT

Figure 1:
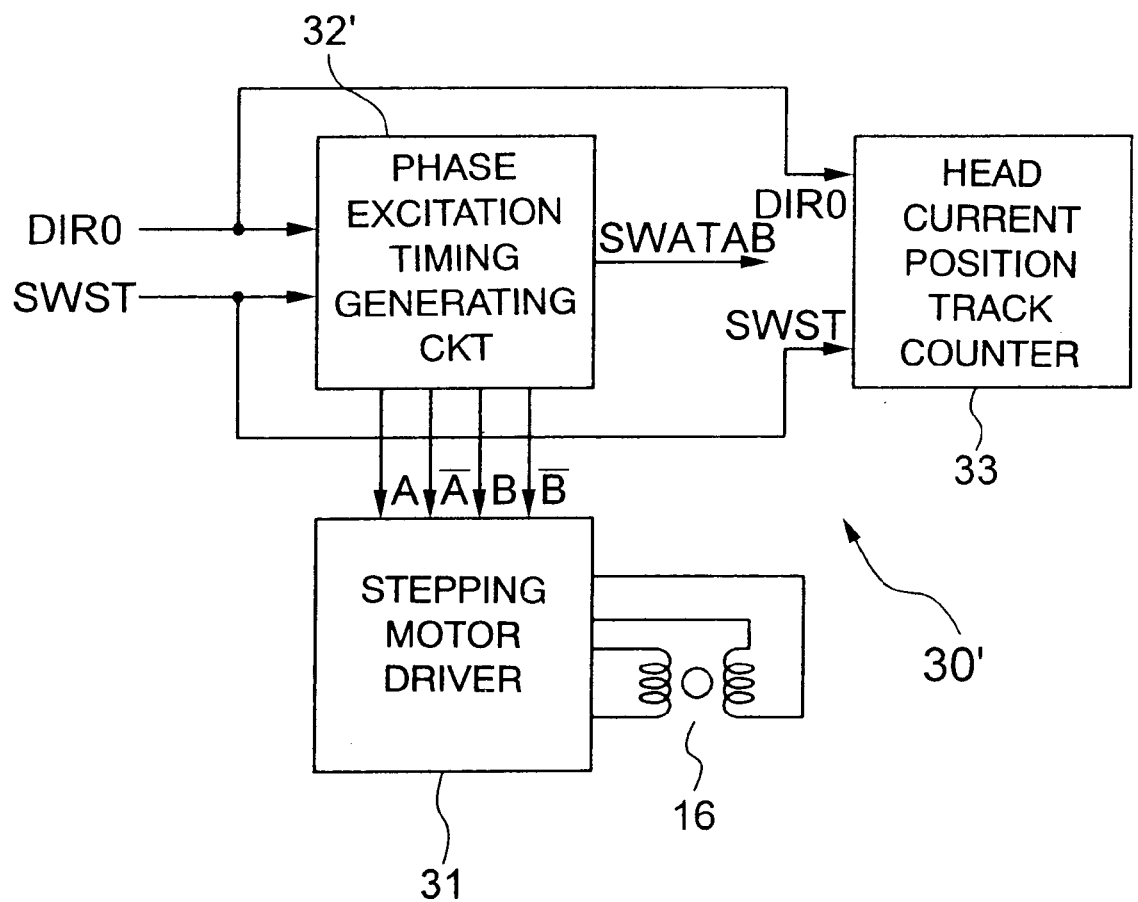
FIG. 1 is a block diagram of a stepping motor control circuit for use in a conventional floppy disk drive (FDD) control apparatus.

Referring to FIG. 1, description will proceed a conventional FDD control apparatus at first in order to facilitate an understanding of the present invention. FIG. 1 illustrates a conventional stepping motor control circuit 30' for use in the conventional FDD control apparatus. The stepping motor control circuit 30' is for controlling a stepping motor 16.

The illustrated stepping motor control circuit 30' comprises a stepping motor driver 31 for driving the stepping motor 16, a phase excitation timing generating circuit 32' for generating a phase excitation timing signal for the stepping motor driver 31 and a head current position track counter 33 for indicating a current position of magnetic heads (not shown).

The phase excitation timing generating circuit 32' is supplied with an external seek direction signal DIRO and an external step signal SWST. The external seek direction signal DIRO is a signal for holding a seek direction signal by triggering the external step signal supplied at a time when a drive select signal takes a logic low level. The drive select signal is a signal for validating the floppy disk drive. When the drive select signal takes the logic low level, the drive select signal indicates validity. In addition, the seek direction signal is a signal for determining a direction for moving the magnetic heads. When the seek direction signal take's a logic low level, the seek direction signal indicates an inner periphery direction. When the seek direction signal takes a logic high level, the seek direction signal indicates an outer periphery direction. The phase excitation timing generating circuit 32' produces a signal SWATAB for generation of substep pulses. The substep pulses are excitation timing pulses for switching a second phase of the stepping motor 16. In addition, the head current position track counter 33 is also supplied with the external seek direction signal DIRO and the external step signal SWST.

At any rate, the conventional FDD control apparatus can carry out the seek operation in spite of insertion/noninsertion of the floppy disk.

However, in a case where the floppy disk is not inserted in the floppy disk drive, malfunctions occur in the conventional FDD control apparatus in the manner which will presently be described.

Figure 2A:
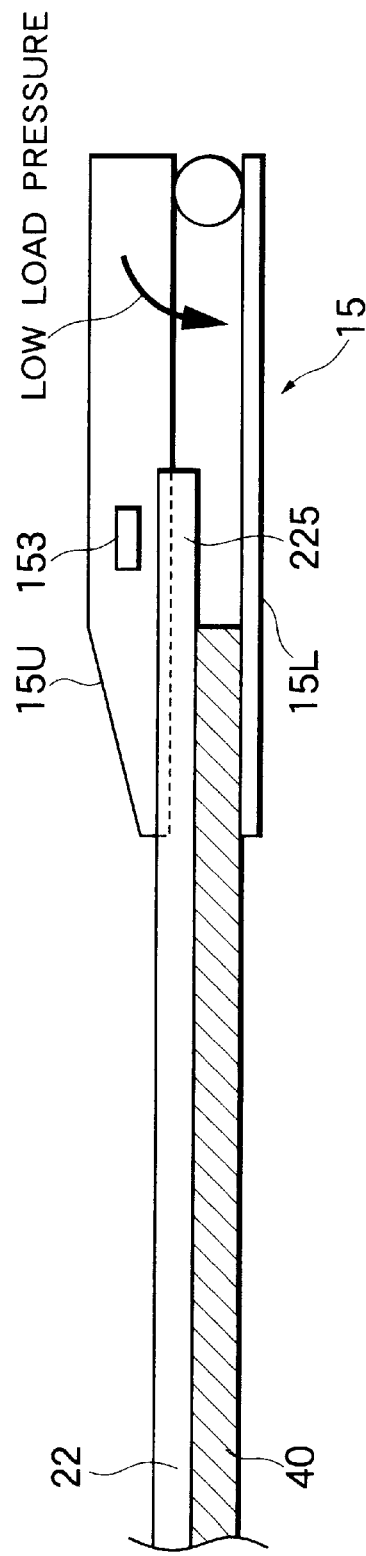
FIGS. 2A and 2B are schematic views for use in describing seek operation in a state where a floppy disk is not loaded in a floppy disk drive.
Figure 2B:
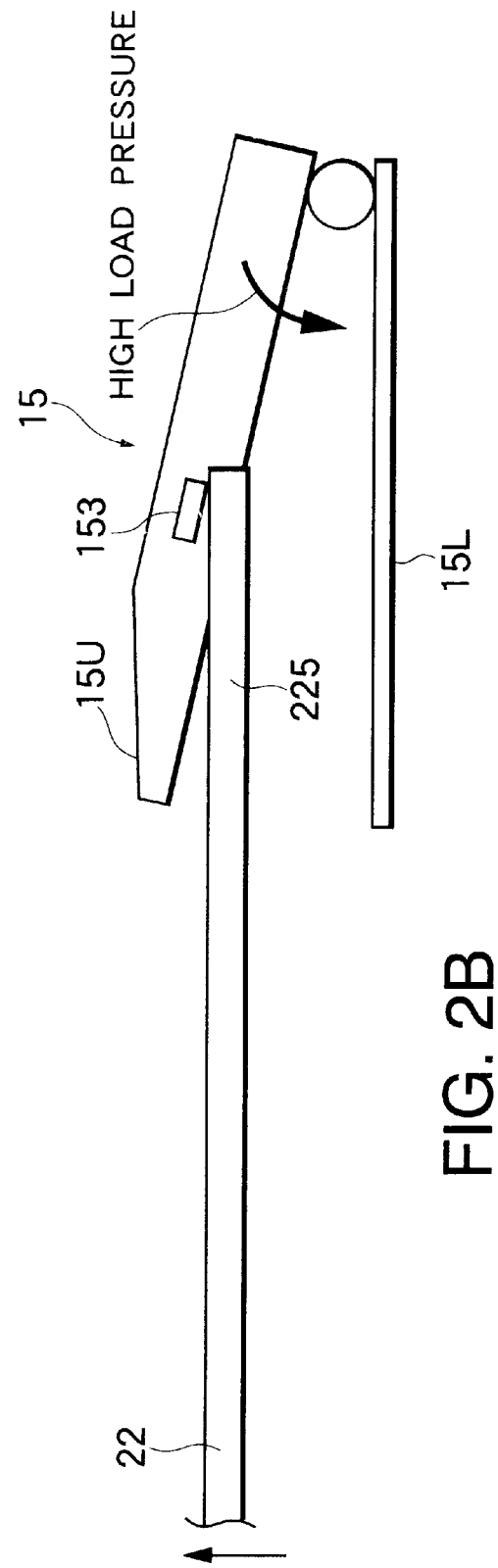

Referring now to FIGS. 2A and 2B, description will proceeds to the malfunctions. FIG. 2A shows a state where the floppy disk is loaded in the floppy disk drive while FIG. 2B shows a state where the floppy disk is not loaded in the floppy disk drive.

As illustrated in FIG. 2A, when the floppy disk depicted at 40 is loaded in the floppy disk drive, a disk holder 22 falls down and side arms 153 attached to an upper carriage 15U of a carriage assembly 15 are not engaged with a swelled portion 225 of the disk holder 22. In this event, a magnetic recording medium (not shown) of the floppy disk 40 is put between a pair of magnetic heads (not shown). Accordingly, it is possible to sufficiently drive the carriage assembly 15 using the stepping motor having the low torgue. This is because the magnetic heads are pressed against the magnetic recording medium with a low spring pressure (which is called a load pressure) and a low load is applied to the carriage assembly 15.

It will be assumed that the floppy disk 40 is not loaded in the floppy disk drive as illustrated in FIG. 2B. Under the circumstances, the disk holder 22 moves upward in the manner depicted at an arrow and the disk holder 22 lifts up the upper carriage 15U of the carriage assembly 15. That is, the side arms 153 attached to the upper carriage 15U of the carriage assembly 15 are engaged with the swelled portion 225 of the disk holder 22. Accordingly, the load with a high load pressure is applied to the carriage assembly 15. As a result, the stepping motor for driving the carriage assembly 15 is required to ensure a higher torque than that in a case where the floppy disk 40 is loaded in the floppy disk drive as illustrated in FIG. 2A.

Accordingly, a first malfunction in the conventional FDD control apparatus is that a seek error may occur due to a large load caused by friction between the side arms 153 and the disk holder 22, as mentioned in the preamble of the instant specification. A second malfunction in the conventional FDD control apparatus is that seek noises on "absence of a medium", namely, in a state where the floppy disk 40 is not loaded in the floppy disk drive as illustrated in FIG. 2B are raised in comparison with seek noises on "presence of the medium", namely, in a state where the floppy disk 40 is loaded in the floppy disk drive as illustrated in FIG. 2A, as mentioned also in the preamble of the instant specification.

Figure 3:
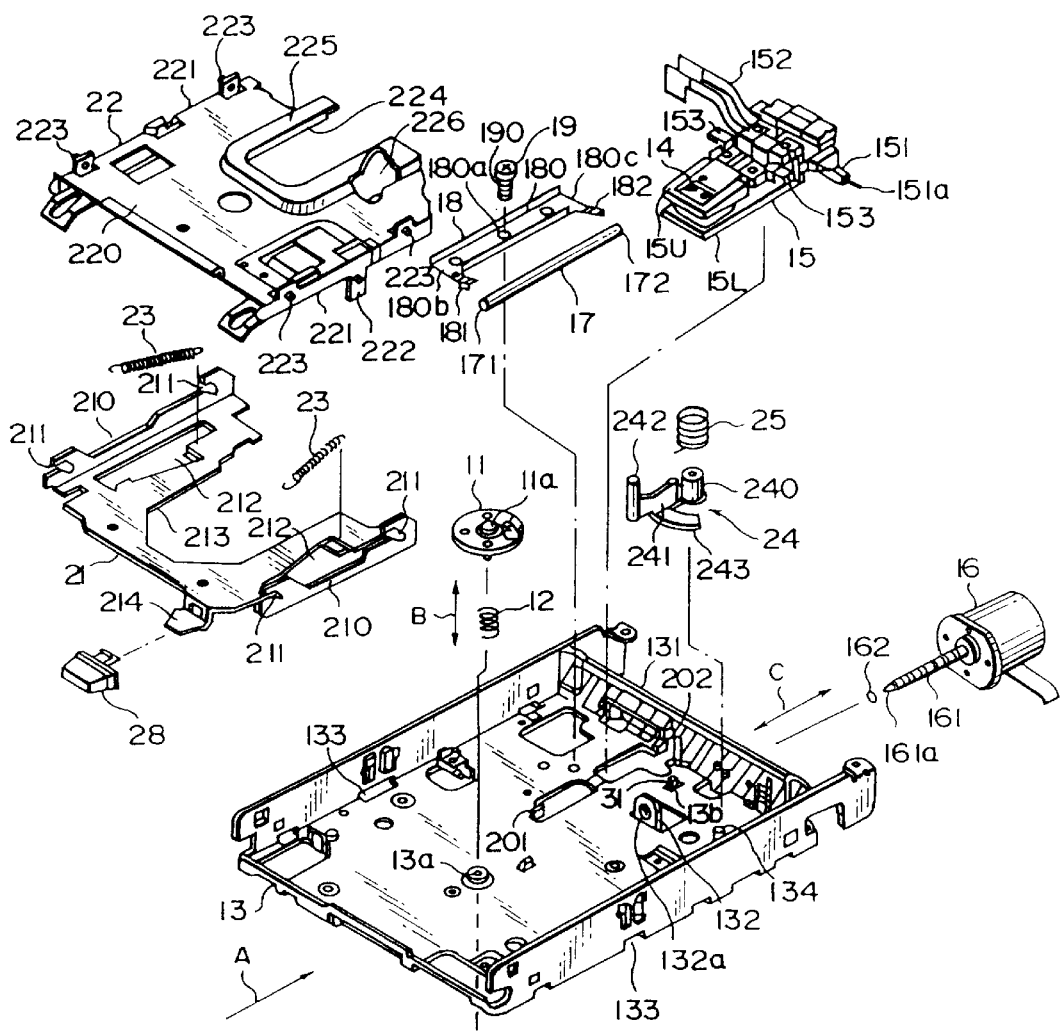
FIG. 3 is an exploded perspective view showing a main part of a floppy disk drive to which a floppy disk drive (FDD) control apparatus according to this invention is applicable.
Figure 4:
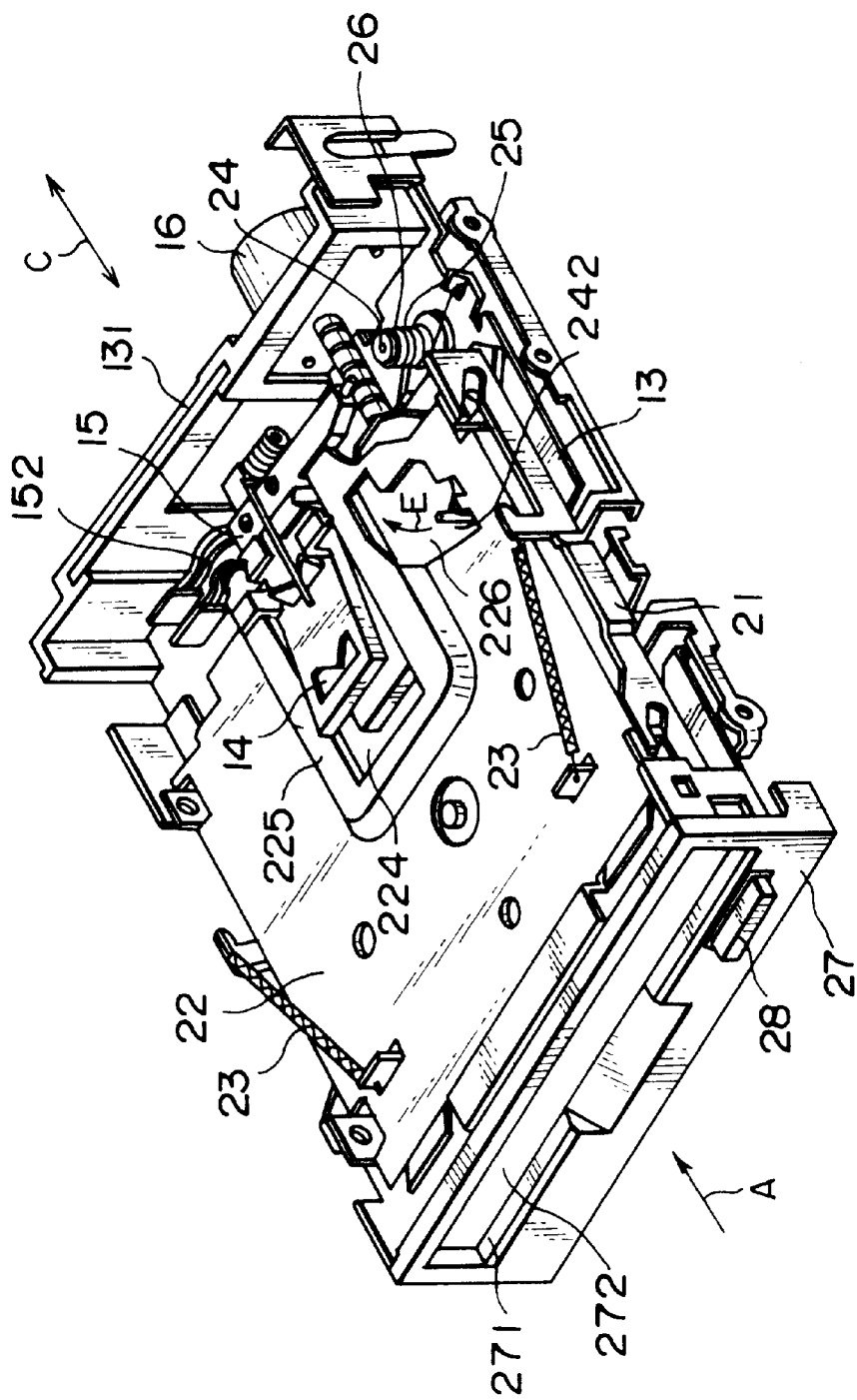
FIG. 4 is a schematic perspective view of the floppy disk drive illustrated in FIG. 3 as view from front obliquely.

Referring to FIGS. 3 and 4, the description will proceed to a floppy disk drive of a 3.5-inch type which is enable to be loaded in a portable electronic equipment and to which an FDD control apparatus according to this invention is applicable. FIG. 3 is an exploded perspective view of the floppy disk drive and FIG. 3 is a perspective view of the floppy disk drive viewing from a front side.

The illustrated floppy disk drive is a device for driving a floppy disk of a 3.5-inch type (which will later be described). The floppy disk is loaded in the floppy disk drive from a direction indicated by an arrow A in FIGS. 3 and 4. The loaded floppy disk is held on a disk table 11 having a rotation axis 11a. In this event, the rotation axis 11a coincides with a center axis of the flexible disk. The rotation axis 11a of the disk table 11 is inserted in a baring 13a formed on a main frame 13 via a spring 12 and therefore the disk table 11 is rotatably supported on a main surface of the main frame 13. Accordingly, the rotation axis 11a of the disk table 11 has an axial direction B which extends in parallel with a thick direction of the main frame 13. The disk table 11 is rotatably driven by a spindle motor (not shown), which is mounted on a back surface of the main frame 13, thereby a magnetic recording medium of the flosppy disk rotates. In addition, on the back surface of the main frame is attached a main printed substrate (which will later become clear) on which a number of electronic parts (not shown) are mounted.

The floppy disk drive comprises a pair of upper and lower magnetic heads 14 (only the upper magnetic head is illustrated) for reading/writing data from/to the magnetic recording medium of the flexible disk. The magnetic heads 14 are supported in a carriage assembly 15 at a tip thereof that is laid in the flexible disk drive at a rear side. That is, the carriage assembly 15 comprises an upper carriage 15U for supporting the upper magnetic head 14 and a lower carriage 15L for supporting the lower magnetic head. The carriage assembly 15 is disposed over the main surface of the main frame 13 and is apart from the main frame 13 in the manner which will later be described. The carriage assembly 15 supports the magnetic heads 14 movably along a predetermined radial direction (i.e. a direction indicated by an arrow C in FIGS. 2 and 3) to the flexible disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161 a which penetrates a hole 132a bored in a bent piece 132 and which is provided with a steel ball 162. The bent piece 132 is raised from the main surface of the main frame 13 by cutting and bending. By the hole 132a and the steel ball 152, a position of the driving shaft 161 is defined so as to extend in parallel with the predetermined radial direction C and the tip 161 a is rotatably held.

On the other hand, the carriage assembly 15 comprises an arm 151 which extends from the lower carriage 15L to the driving shaft 161. The arm 151 has a leading edge 151a which is bent so as engage with the root in the male screw of the driving shaft 161. Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the main surface of the main frame 13. However, because support occurs by the driving shaft 161, it is difficult to dispose the whole of the carriage assembly 15 apart from the main surface of the frame 13. For this purpose, it is necessary to support and guide the carriage assembly 15 at another side thereof. To guide the carriage assembly 15 is a guide bar 17. That is, the guide bar 17 is opposed to the driving shaft 17 of the stepping motor 16 with the carriage assembly 15 inserted between the guide bar 17 and the driving shaft 161. The guide bar 17 extends in parallel with the predetermined radial direction C and has one end 171 and another end 172 which are mounted on the main surface of the main frame 13 in the manner which later be described. The guide bar 17 guides the carriage assembly 15 along the predetermined radial direction C. As a result, the whole of the carriage assembly 15 is disposed from the main surface of the main frame 13.

In addition, a flexible printed circuit (FPC) 152 extends from the carriage assembly 15 to the vicinity of the guide bar 17 and the flexible printed circuit 152 are electrically connected to the main printed substrate attached to the back surface of the main frame 13.

The guide bar 17 is clamped on the main surface of the main frame 13 by a guide bar clamp 18. The guide bar clamp 18 is fixed on the main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar clamp 18 merely clamps the guide bar 17, the guide bar 17 is not mounted on the main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 is used which are formed by cutting and bending parts of the main frame 13. At any rate, the pair of bent pieces 201 and 202 locates both ends 171 and 172 of the guide bar 17 to mount the guide bar 17 on the main surface of the main frame 13 in cooperation with the guide bar clamp 18.

The lower carriage 15L of the carriage assembly 15 serves as a supporting frame for supporting the carriage assembly 15 slidably along the guide bar 17. The lower carriage 15L has a projecting portion (not shown) which projects into the main surface of the main frame 13 at a side of the guide bar 17. The guide bar 17 is slidably fitted in the projection portion.

The floppy disk drive further comprises an eject plate 21 and a disk holder 22. Each of the main frame 13, the eject plate 21, and the disk holder 22 is formed to perform bending, press working, and bending of a metal plate.

The eject plate 21 is mounted on the main surface of the main frame 13 slidably along the insertion direction A of the flexible disk and an opposite direction. In the manner which will later become clear, the eject plate 21 holds, in cooperation with the disk holder 22, the floppy disk on operating of the flexible disk drive. In addition, the eject plate 21 holds the flexible disk slidably along in the insertion direction A so as to allow the floppy disk drive to load the floppy disk therein along the insertion direction A and to allow the floppy disk drive to eject the floppy disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11 a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 22 and the bores 133 are formed in the main frame 13 in the above-mentioned embodiment, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. As will later be described, in a state where the floppy disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counterclockwise direction on a paper of FIG. 2. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 4, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the floppy disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 5:
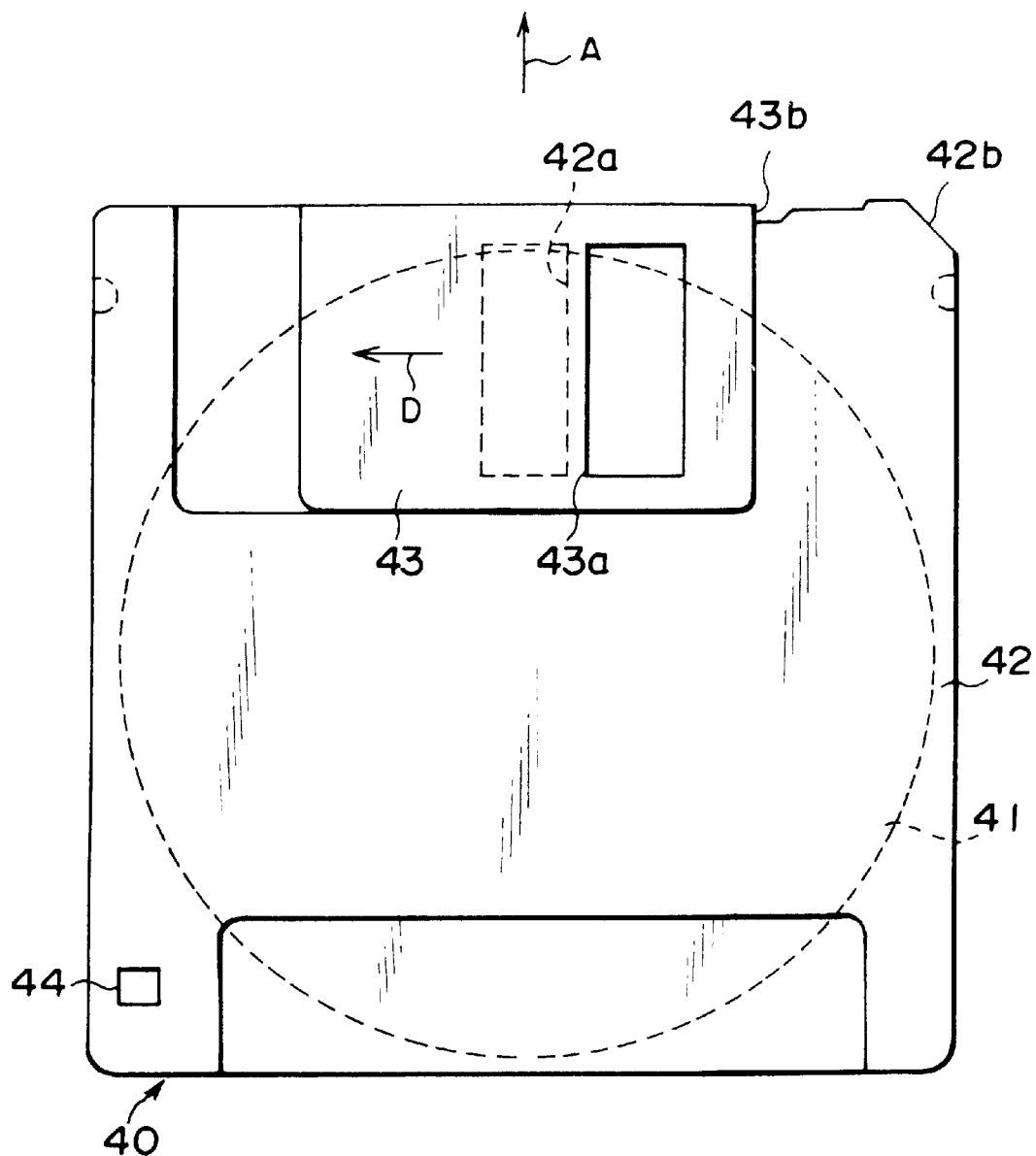
FIG. 5 is a plan view showing a floppy disk driven by the floppy disk drive.

Referring to FIG. 5, the description will proceed to the floppy disk (FD) driven by the floppy disk drive (FDD) illustrated in FIGS. 3 and 4. The illustrated floppy disk depicted at 40 comprises a disk-shaped magnetic recording medium 41, a shell 42 for covering or receiving the magnetic recording medium 41, and the shutter depicted at 43 slidably in a direction indicated by an arrow D in FIG. 5. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 3 and 4) of the floppy disk drive.

In a state where the floppy disk 40 is not loaded in the floppy disk drive, the head window 43a is covered by the shutter 43 as shown in FIG. 5. When the floppy disk 40 is loaded in the floppy disk drive, the projection part 242 of the eject lever 24 (FIG. 3) engages with the upper end 43b of the right-hand side edge of the shutter 43 to slide the shutter 43 in the direction depicted at the arrow D.

The shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 5.

As described above, in the floppy disk 40 driven by the floppy disk drive, the magnetic recording medium 41 accessed by the magnetic heads 14 (FIGS. 3 and 4) has a plurality of tracks on a surface thereof that serve as paths for recording data and that are formed in a concentric circle along a radial direction. The flexible disk 40 has eighty tracks on side which include the most outer circumference track (the most end track TR00 and the most inner circumference track TR79.

Figure 6:
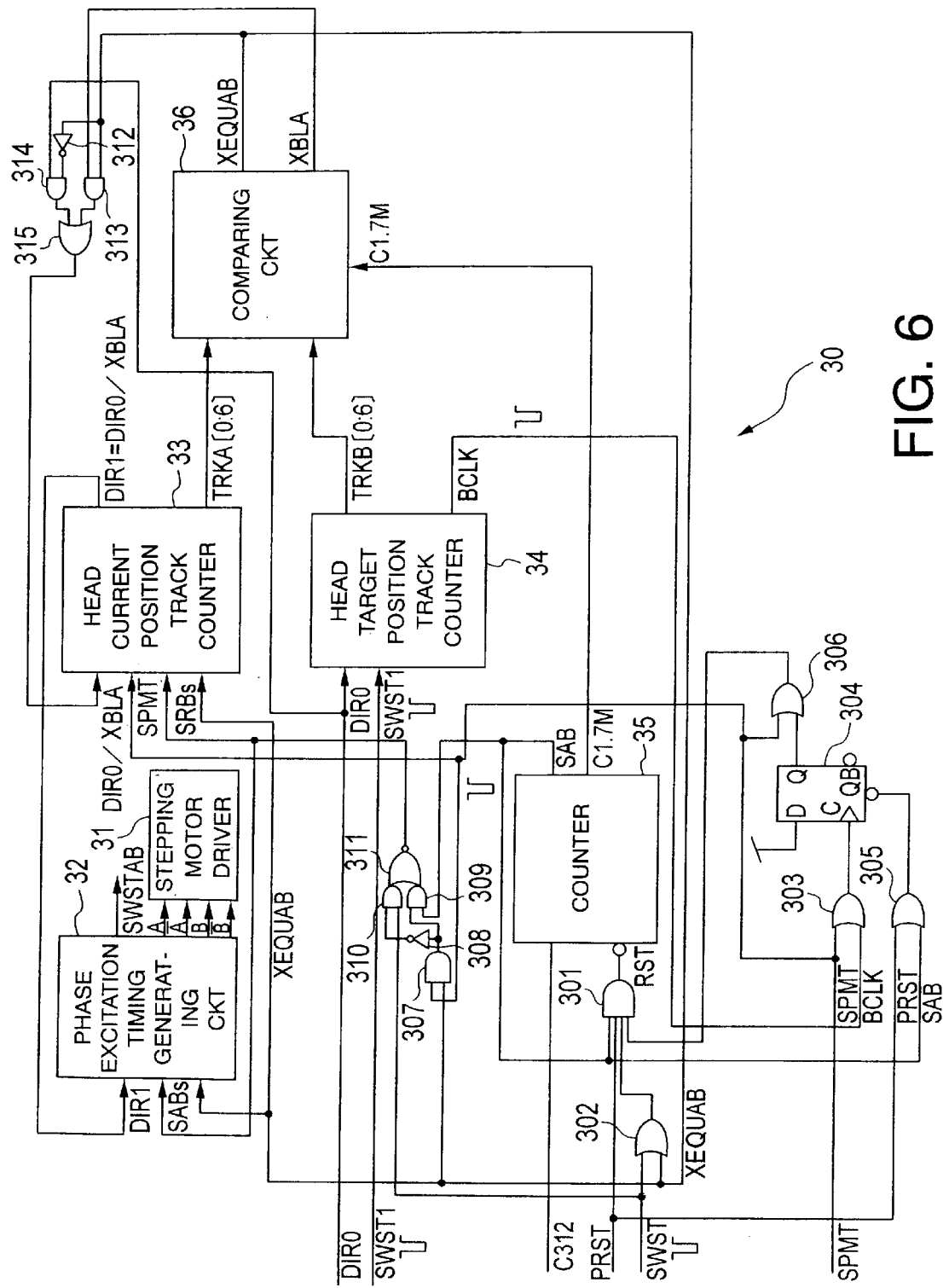
FIG. 6 is a block diagram of a stepping motor control circuit for use in a floppy disk drive (FDD) control apparatus according to an embodiment of this invention.

Referring to FIG. 6, the description will proceed to an FDD control apparatus for controlling the floppy disk drive illustrated in FIGS. 3 and 5. FIG. 6 shows a stepping motor control circuit 30 for use in the FDD control apparatus according to an embodiment of this invention.

As illustrated in FIG. 6, the stepping motor control circuit 30 comprises the stepping motor driver 31 for driving the stepping motor 16 (FIG. 3), a phase excitation timing generating circuit 32 for generating a phase excitation timing signal for the stepping motor driver 31, the head current position track counter 33 for indicating a current position of magnetic heads 14 (FIG. 3), a head target position track counter 34 for indicating a target position of the magnetic heads 14, a counter 35, a comparing circuit 36, and various logic circuits and flip-flops which will later be described.

The illustrated stepping motor control circuit 30 is supplied with, as input signals, an external step signal SWST1, an external seek direction signal DIRO, a signal C312, an external reset signal PRST, an external step signal SWST, and a signal SPMT.

In the manner which is described above, the external seek direction signal DIRO is the signal holding the seek signal by triggering the step signal supplied at a time when the drive select signal takes the logic high level. The external step signal SWST1 is a signal supplied at a time when the drive select signal takes the logic low level. The signal C312 is an external clock signal having a clock period of 3.1 milliseconds. The external reset signal PRST is a signal validated after a lapse of 100 milliseconds from power on. The external step signal SWST is a step signal supplied at a time when the drive select signal takes the logic low level and when the signal SPMT, which will later be described, takes the logic high level. The signal SPMT is a signal validated after a lapse of 200 millisecond when the spindle motor is turned on. The signal SPMT is the signal indicating whether or not the floppy disk 40 (FIG. 5) is inserted in the floppy disk drive.

The external seek direction signal DIRO and the external step signal SWST1 are supplied to the head target position track counter 34. The external clock signal C312 is supplied to the counter 35. The external reset signal PRST is supplied to the counter 35 through a first AND gate 301 as an internal reset signal RST. In the manner which will later become clear, the first AND gate 301 produces a first ANDed signal as the internal reset signal RST. The external step signal SWST is supplied to the counter 35 through a first OR gate 302 and the first AND gate 301. In the manner which will later become clear, the first OR gate 302 produces a first ORed signal. The signal SPMT is supplied to the head current position track counter 33.

In the manner which will later be described, the head target position track counter 34 produces an internal clock signal. The signal SPMT and the internal clock signal BCLK are supplied to a second OR gate 303. The second OR gate 303 ORs the signal SPMT and the internal clock signal BCLK to produce a second ORed signal which is supplied to a clock input terminal of a D-type flip-flop 304. In the manner which will later be described, the counter 35 produces an internal step signal SAB. The external reset signal PRST and the internal step signal SAB are supplied to a third OR gate 305. The third OR gate 305 ORs the external reset signal PRST and the internal step signal SAB to produce a third ORed signal which is supplied to a reset terminal of the D-type flip-flop 304. The D-type flip-flop 304 produces a held output signal which is supplied to a fourth OR gate 306. The fourth OR gate 306 is supplied with the signal SPMT The fourth OR gate 306 ORs the held output signal from the D-type flip-flop 304 and the signal SPMT to produce a fourth ORed signal which is supplied to the first AND gate 301. The first AND gate 301 is also supplied with the internal step signal SAB from the counter 35. That is, the first AND gate 301 ANDs the internal step signal SAB, the external reset signal PRST, the first ORed signal, and the fourth ORed signal to produce the first ANDed signal which is supplied to the counter 35 as the internal reset signal RST The counter 35 produces the internal step signal SAB every four milliseconds. The internal step signal SAB is for equalizing a current position counted value A of the head current position track counter 33 with a target position counted value B of the head target position track counter 34. At any rate, the counter 35 is activated while the floppy disk 40 (FIG. 5) is inserted or loaded in the floppy disk drive and serves as an internal step signal producing arrangement for producing the internal step signal SAB.

In addition, the counter 35 is triggered by the external step signal SWST to produce a trigger signal C1.7M for comparing the current position counted value A of the head current position track counter 33 with the target position counted value B of the head target position track counter 34. The trigger signal C1.7M is supplied to the comparing circuit 36.

In the manner which will later be described, the comparing circuit 36 produces a coincidence signal XEQUAB which is supplied to the first OR gate 302. The coincidence signal XEQUAB takes the logic high level when the current position counted value A of the head current position track counter 33 is different from the target position counted value B of the head target position track counter 34. The coincidence signal XEQUAB takes the logic low level when the current position counted value A of the head current position track counter 33 is equal to the target position counted value B of the head target position track counter 34. When the coincidence signal XEQUAB takes the logic high level or when the current position counted value A is different from the target position counted value B, the first OR gate 302 masks the external step signal SWST. The coincidence signal XEQUAB is also supplied to the phase excitation timing glenerating circuit 32 and the head current position track counter 33.

Furthermore, the coincidence signal XEQUAB is supplied to a second AND gate 307 which is supplied with the signal SPMT. The second AND gate 307 ANDs the coincidence signal XEQUAB and the signal SPMT to produce a second ANDed signal which is supplied to a first inverter 308 and a third AND gate 309. The third AND gate 309 is supplied with the internal step signal SAB from the counter 35. The third AND gate 309 ANDs the third ANDed signal and the internal step signal SAB to produce a third ANDed signal. The first inverter 308 inverts the second ANDed signal to produce a first inverted signal which is supplied to a fourth AND gate 310. The fourth AND gate 310 is supplied with the external step signal SWST. The fourth AND gate 310 ANDs the first inverted signal and the external step signal SWAT to produce a fourth ANDed signal. The third ANDed signal and the fourth ANDed signal are supplied to a NOR gate 311. The NOR gate 311 NORs the fourth ANDed signal and the third ANDed signal to produce a NORed signal as a selected step signal SABs.

That is, a combination of the second AND gate 307, the first inverter 308, the third AND gate 309, the fourth AND gate 310, and the NOR gate 311 is activated when the floppy disk 40 (FIG. 5) is inserted or loaded in the floppy disk drive and serves as a step signal selecting arrangement for selecting the external step signal SWST as the selected step signal SABs when the coincidence signal XEQUAB takes the logic low level and for selecting the internal step signal SAB as the selected step signal SABs when the coincidence signal XEQUAB takes the logic high level. Produced by the step signal selecting arrangement, the selected step signal SABs is supplied to the phase excitation timing generating circuit 32 and the head current position track counter 33.

Regardless of whether the floppy disk 40 is inserted or loaded in the floppy disk drive or not, the head target position track counter 34 produces, in response to the external seek direction signal DIRO and the external step signal SWST1, the internal clock signal BCLK and a target track position signal TRKB[0:6] indicative of the target position counted value B corresponding to a target track position of the magnetic heads 14 (FIG. 3). Although the internal clock signal BCLK is a signal through which the external step signal SWST passes, the internal clock signal BLCK is masked when the target position counted value B of the head target position track counter 34 has a value between "0" and "81", both inclusive.

The target track position signal TRKB[0:6] is supplied to the comparing circuit 36. In the manner which will later be described, the head current position track counter 33 produces a current track position signal TRKA[0:6] indicative of the current position counted value A corresponding to an actual current track position of the magnetic heads 14. The comparing circuit 36 is supplied with the current track position signal TRKA[0:6]. Responsive to the trigger signal C1.7M, the comparing circuit 36 compares the current position counted value A indicated by the current track position signal TRKA[0:6] with the target position counted value B indicated by the target track position signal TRKB [0:6] to produce the above-mentioned coincidence signal XEQUAB and an internal seek direction signal XBLA. In the manner which is described above, the coincidence signal XEQUAB takes the logic high level when the current position counted value A is different from the target position counted value B and takes the logic low level when the current position counted value A is equal to the target position counted value B.

The internal seek direction signal XBLA takes the logic high level when the current position counted value A is larger than the target position counted value B. The internal seek direction signal XBLA takes the logic low level when the current position counted value A is smaller than the target position counted value B. In other words, the internal seek direction signal XBLA is a signal indicative of a seek direction for equalizing the current position counted value A with the target position counted value B.

The coincidence signal XEQUAB is supplied to a second inverter 312 and a fifth AND gate 313. The fifth AND gate 313 is supplied with the internal seek direction signal XBLA. The fifth AND gate 313 ANDs the coincidence signal XEQUAB and the internal seek direction signal XBLA to produce a fifth ANDed signal. The second inverter 312 inverts the coincidence signal to produce a second inverted signal which is supplied to a sixth AND gate 314. The sixth AND gate 314 is supplied with the external seek direction signal DIRO. The sixth AND gate 314 ANDs the second inverted signal and the external seek direction signal DIRO to produce a sixth ANDed signal. The sixth ANDed signal and the fifth ANDed signal are supplied to a fifth OR gate 315. The fifth OR gate 315 ORs the fifth ANDed signal and the sixth ANDed signal to produce a fifth ORed signal as a selected seek direction signal DIRO/XBLA which is supplied to the head current position track counter 33.

At any rate, a combination of the second inverter 312, the fifth AND gate 313, the sixth AND gate 314, and the fifth OR gate 315 serves as a seek direction selecting arrangement for selecting the internal seek direction signal XBLA as the selected seek direction signal DIRO/XBLA when the coincidence signal XEQUAB takes the logic high level and for selecting the external seek direction signal DIRO as the selected seek direction signal DIRO/XBLA when the coincidence signal XEQUAB takes the logic low level.

When the coincidence signal XEQUAB takes the logic high level or when the current position counted value A is different from the target position counted value B, the head current position track counter 33 counts, in synchronism with the internal step signal SAB, the current position counted value A in a direction indicated by the internal seek direction signal XBLA. Conversely, when the coincidence signal XEQUAB takes the logic low level or when the current position counted value A is equal to the target position counted value B, the head, current position track counter 33 counts, in synchronism with the external step signal SWST, the current position counted value A in a direction indicated by the external seek direction signal DIRO. The head current position track counter 33 produces the above-mentioned current track position signal TRKA [0:6] and a selected seek direction signal DIR1. The selected seek direction signal DIR1 is the selected seek direction signal DIRO/XBLA supplied to the head current position track counter 33 as it is. The selected seek direction signal DIR1 is supplied to the phase excitation timing generating circuit 32.

The phase excitation timing generating circuit 32 operates in synchronism with the internal step signal SAB when the coincidence signal XEQUAB takes the logic high level or when the current position counted value A is different from the target position counted value B. In this event, the phase excitation timing generating circuit 32 generates the signal SWSTAB for generating substep pulses. On the other hand, when the coincidence signal XEQUAB takes the logic low level or when the current position counted value A is equal to the target position counted value B, the phase excitation timing generating circuit 32 operates in synchronism with the external step signal SWST. That is, a combination of the phase excitation timing generating circuit 32 and the stepping motor driver 31 serves as a driving arrangement for driving the stepping motor 16 (FIG. 3) on the basis of the selected seek direction signal DIR1 and the selected step signal SABs.

In addition, a combination of the counter 35, the head current position track counter 33, the comparing circuit 36, the phase excitation timing generating circuit 32, the stepping motor driver 31, the seek direction selecting arrangement, and the step signal selecting arrangement serves as an automatic seeking arrangement for automatically seeking the magnetic heads 14 (FIG. 3) up to the target track position indicated by the target track position signal TRKA[0:6] by driving the stepping motor 16 (FIG. 3) when the floppy disk 40 (FIG. 5) is inserted or loaded in, the floppy disk drive.

Referring now to FIG. 6, the description will proceed to operation of the stepping motor control circuit 30. First, the description will proceed to operation where the floppy disk 40 (FIG. 5) is not inserted or loaded in the floppy disk drive. In this event, inasmuch as the signal SPMT becomes invalid or takes the logic high level, the head current position track counter 33 does not operate. In addition, the seek operation is prohibited. On the other hand, the head target position track counter 34 produces, in response to the external seek direction signal DIRO and the external step signal SWST1, the target track position signal TRKB[0:6] indicative of the target track position of the magnetic heads 14 (FIG. 3).

In this state, it will be assumed that the floppy disk 40 (FIG. 5) is inserted or loaded in the floppy disk drive. In this event, the signal SMPT becomes valid or takes the logic low level. Inasmuch as the signal SMPT is supplied to the counter 35 through the first AND gate 301 as the reset signal RST, the counter 35 starts count operation in response to a leading edge of the signal SPMT. After a lapse of 1.7 milliseconds from this operation start time instant, the counter 35 supplies the trigger signal C1.7M to the comparing circuit 37. Responsive to the trigger signal C1.7M, the comparing circuit 37 compares the target track position signal TRKB[0:6] (the target position counted value B) produced by the head target position track counter 34 with the current track position signal TRKA[0:6] (the current position counted value A) produced by the head current position track counter 33.

When the current position counted value A is equal to the target position counted value B, the comparing circuit 36 produces the coincidence signal XEQUAB of the logic low level indicative of coincidence. Accordingly, the stepping motor control circuit 30 does not carry out an automatic seek operation and waits for the external step signal SWST. In this event, the counter 35 stops the count operation.

On the other hand, it will be assumed that the current position counted value A is different from the target position counted value B. In this event, the comparing circuit 36 produces the internal seek direction signal XBLA and the coincidence signal XEQUAB of the logic high level indicative of noncoincidence. The counter 35 produces the internal step signal SAB every four milliseconds. The internal seek direction signal XBLA is selected by the above-mentioned seek direction selecting arrangement as the selected seek direction signal to be supplied to the head current position track counter 33 and the phase excitation timing generating circuit 32. In addition, the internal step signal SAB is also selected by the above-mentioned step signal selecting arrangement as the selected step signal SABs to be supplied to the head current position track counter 33 and the phase excitation timing generating circuit 32. Accordingly, the automatic seek operation is carried out. The automatic seek operation is carried out until the current position counted value A becomes equal to the target position counted value B.

In addition, triggered by the internal step signal SAB, the counter 35 supplies the trigger signal Cl.7M to the comparing circuit 37 after a lapse of 1.7 milliseconds. The comparing circuit 36 compares the current position counted value A with the target position counted value B. Until the current position counted value A becomes equal to the target position counted value B or until the coincidence signal XEQUAB indicates coincidence of the logic low level, the counter 35 carries out count operation.

In addition, after the current position counted value A becomes equal to the target position counted value B so that the above-mentioned automatic seek operation comes to end, the stepping motor control circuit 30 carries out an ordinary seek operation in response to the external step signal SWST and the external seek direction signal DIRO. Thereafter, the head current position track counter 33 and the head target position track counter 34 continue to count the current position counted value A and the target position counted value B which are always equal to each other.

In the manner which is described above, according to this invention, inasmuch as the stepping motor control circuit 30 inhibits the seek operation when the floppy disk is not inserted or loaded in the floppy disk drive, it is possible to prevent occurrence of a seek error and to suppress seek noises on absence of a medium.

While this invention has thus far been described in conjunction with a preferred embodiment thereof, it is to be understood that modifications will be apparent to those skilled in the art without departing from the sprit of the invention.

What is claimed is:

1. A stepping motor control circuit for controlling, in response to an external seek direction signal and an external stepping signal, a stepping motor to cause magnetic heads of a floppy disk drive to perform a seek operation, wherein said stepping motor control circuit comprises:

a head target position track counter for producing, in response to said external seek direction signal and said external stepping signal, a target track position signal indicative of a target track position for said magnetic heads regardless of whether or not a floppy disk is loaded in said floppy disk drive; and means for automatically moving said magnetic heads up to the target track position indicated by said target track position signal by driving said stepping motor only when said floppy disk is loaded in said floppy disk drive.

2. A stepping motor control circuit for controlling, in response to an external seek direction signal and an external stepping signal, a stepping motor to cause magnetic heads of a floppy disk drive to perform a seek operation, wherein said stepping motor control circuit comprises:

a head target position track counter for producing, in response to said external seek direction signal and said external stepping signal, a target track position signal indicative of a target track position for said magnetic heads regardless of whether or not a floppy disk is loaded in said floppy disk drive;

internal stepping signal producing means for producing an internal stepping signal when said floppy-disk is loaded in said floppy disk drive;

a head current position track counter which is inactivated when said floppy disk is not loaded in said floppy disk drive, and which is activated when said floppy disk is loaded in said floppy disk drive to produce, in response to a selected seek direction signal and a selected stepping signal, a current track position signal indicative of an actual current track position for said magnetic heads;

a comparing circuit for comparing said target track position signal with said current track position signal when said floppy disk is loaded in said floppy disk drive, and for producing an internal seek direction signal and a coincidence signal indicative of coincidence/noncoincidence between said target track position and said current track position based on said comparison;

seek direction selecting means for: (i) selecting said internal seek direction signal as said selected seek direction signal when said coincidence signal indicates noncoincidence, (ii) selecting said external seek direction signal as said selected seek direction signal when said coincidence signal indicates coincidence, and (iii) supplying said selected seek direction signal to said head current position track counter;

stepping signal selecting means, being activated when said floppy disk is loaded in said floppy disk drive, for: (i) selecting said internal stepping signal as said selected stepping signal when said coincidence signal indicates noncoincidence, (ii) selecting said external stepping signal as said selected stepping signal when said coincidence signal indicates coincidence, and (iii) supplying said selected stepping signal to said head current position track counter; and driving means for driving said stepping motor based on said selected seek direction signal and said selected stepping signal.

* * * * *